T. S. DUNCAN.
LANDING DEVICE FOR AEROPLANES AND HYDROAEROPLANES.
APPLICATION FILED FEB. 24, 1916.
1,234,311.
Patented July 24, 1917.
2 SHEETS—SHEET 1.
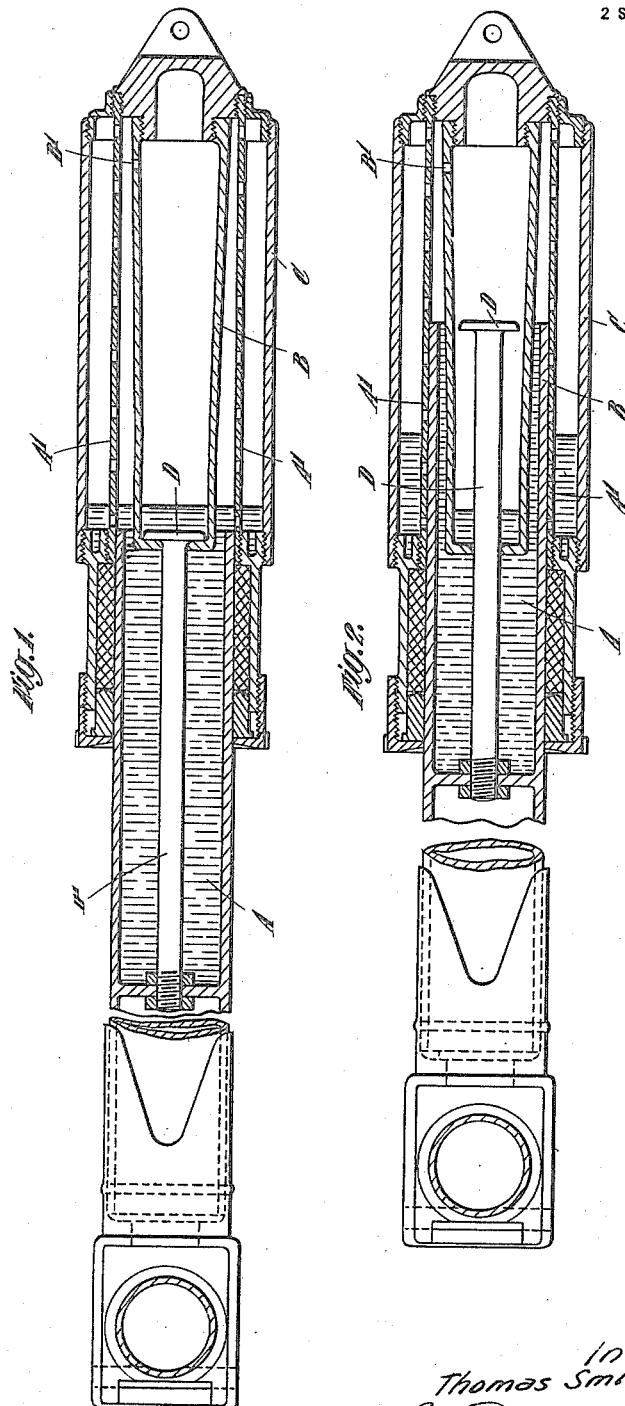
Inventor:
Thomas Smith Duncan
By [signature]
Attys.

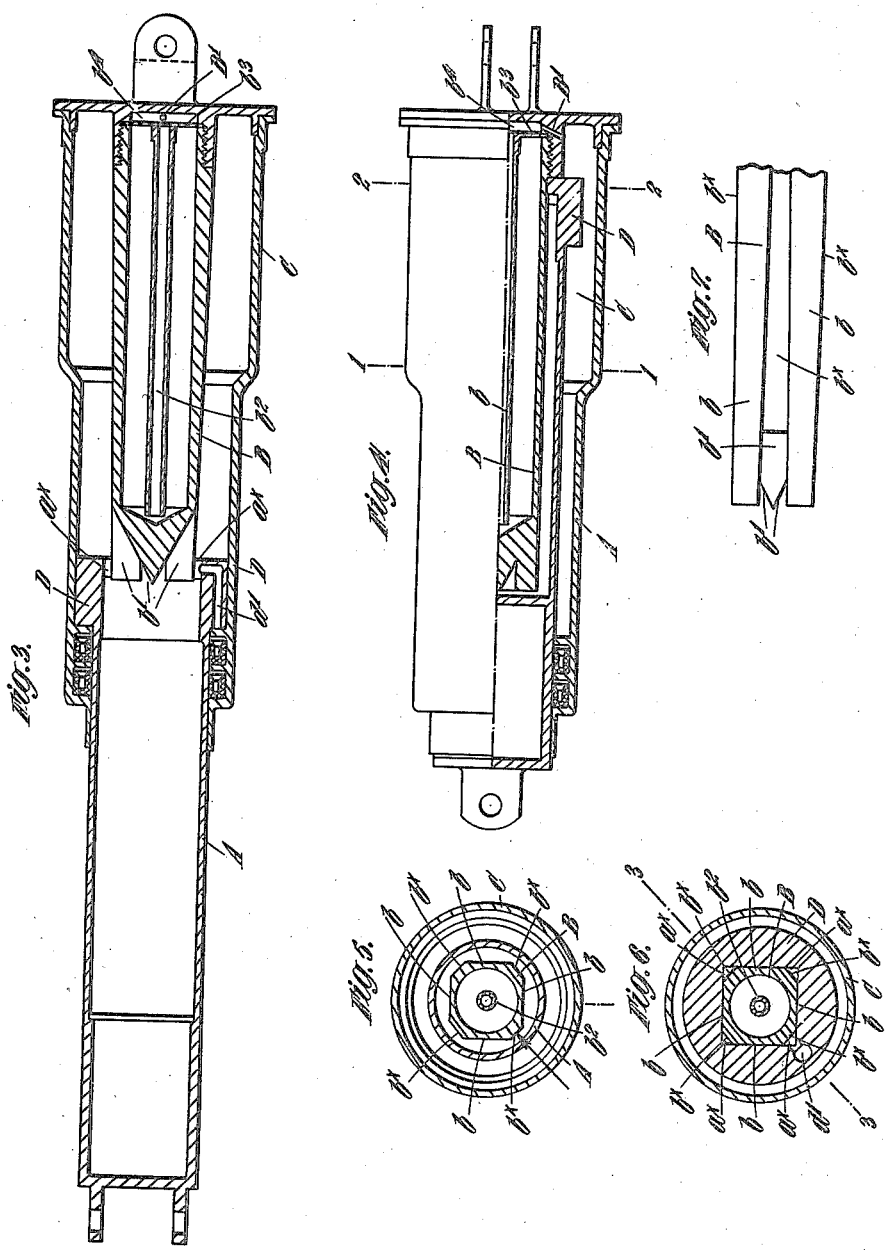

UNITED STATES PATENT OFFICE.

THOMAS SMITH DUNCAN, OF CRAYFORD, ENGLAND, ASSIGNOR TO VICKERS LIMITED, OF WESTMINSTER, ENGLAND.

LANDING DEVICE FOR AEROPLANES AND HYDROAEROPLANES.

1,234,311.  Specification of Letters Patent.  Patented July 24, 1917.

Application filed February 24, 1916. Serial No. 80,138.

*To all whom it may concern:*

Be it known that I, THOMAS SMITH DUNCAN, a subject of the King of Great Britain, residing at Crayford, in the county of Kent, England, have invented certain new and useful Improvements in or Relating to the Landing Devices for Aeroplanes and Hydroaeroplanes, of which the following is a specification.

This invention relates to aeroplane and hydro-aeroplane landing devices of the kind in which a resilient connection is provided between the landing wheels, skids or floats and the under part of the framework of the aeroplane in order to absorb or reduce the shock when the wheels or skids strike the ground at the instant of landing, the said connection comprising two telescopic members one attached to the framework of the aeroplane or hydro-aeroplane and the other to the landing wheel axle, the skid or the float; the said telescopic members inclose between them compressed air and oil or other liquid, and are normally kept in an extended or partially extended condition by the pressure of the air but are adapted when subjected to shock or other form of pressure to dissipate the energy partly by further compressing the air and partly by causing the liquid to be forced through a passage or passages from one part to another of the device, the said passage or passages decreasing gradually in cross sectional area the greater the relative movement between the members, so that a graduated retardation is produced.

According to the present invention the return of the parts to their normal position by the reaction of the compressed air is retarded by a piston moving with one of the aforesaid members and working in a cylinder containing or adapted to receive some of the oil or other liquid, the piston thus acting as a buffer to bring the said members gently to rest in their normal or extended position. This piston may be in the form of an enlargement of the upper or inner end of the oil cylinder and may work in the lower or inner part of the air chamber. In order to insure that there shall be liquid beneath this enlargement even if the oil cylinder should perform only a relatively short stroke, the said enlargement is formed with one or more holes leading from the interior of the oil cylinder to the lower or outer surface of the said enlargement.

The air chamber may carry a displacement ram which is so constructed and arranged that it will guide the oil cylinder during its reciprocating movements and at the same time will enable liquid to pass from the oil cylinder to the air chamber during the contraction of the telescopic members.

The said displacement ram may be made hollow and within it may be arranged a pipe whose lower or inner end terminates near the bottom of the said ram and whose upper or outer end terminates in a chamber at the upper or outer end of the ram, this chamber communicating with the aforesaid air chamber. This arrangement insures that if any appreciable quantity of liquid should collect at the bottom of the ram during the contraction of the parts, this liquid will during the extension of the parts be blown out through the pipe into the air chamber by the compressed air which had been compressed in the upper or outer part of the interior of the ram during the contraction of the parts.

In order that the said invention may be clearly understood and readily carried into effect, we will describe the same more fully with reference to the accompanying drawings, in which:—

Figures 1 and 2 are longitudinal sections showing a constructional form of the improved landing device in its normal or extended position and in its telescoped or contracted position respectively.

Figs. 3 and 4 are longitudinal sections in different planes but otherwise similar to Figs. 1 and 2 showing a modified form of the landing device.

Fig. 5 is a section taken approximately on the line 1—1 of Fig. 4.

Fig. 6 is a section taken approximately on the line 2—2 of Fig. 4, and

Fig. 7 is a side elevation viewed in the direction of the arrow in Fig. 5, showing part of the displacement ram hereinafter referred to.

The sectional view Fig. 3 is taken on the line 3, 3 of Fig. 6.

The various figures show the landing device horizontal whereas it will be understood that when in position on an aeroplane or hydro-aeroplane it will be more or less vertical. The left hand end of the device is hereinafter referred to as the lower end and the right hand end as the upper end.

A represents the oil cylinder attached to the axle of the wheels, to one of the skids or to one of the floats. B represents the displacement ram and C represents the air chamber, these two parts being attached to the framework of the aeroplane or hydro-aeroplane. D represents the aforesaid piston for retarding the extending movement of the members constituting the landing device.

Referring particularly to the form of the invention shown by Figs. 1 and 2, the displacement ram B is of circular cross-section and is tapered, its smaller end being lowermost, so that the farther it enters the oil cylinder A, the narrower becomes the annular space through which the oil can escape from the upper end of the oil cylinder, thereby insuring a graduated retarding effect. The lower end of the air cylinder C carries an adjustable stuffing box through which the upper end of the oil cylinder A projects into the space between the air chamber C and the displacement ram B. In order to guide and support the oil cylinder A in its up and down movements in the aforesaid space, a perforated cylinder A' or other form of guide is provided. The piston D is made of smaller diameter than the smallest internal diameter of the displacement ram B and is formed on or carried by a rod D' passing through the lower end of the said ram and connected at its lower end to the base of the oil cylinder A. For the working of the landing device, sufficient oil is used to fill the oil cylinder A and submerge the lower end of the displacement ram B, when the parts are in their extended position, air at a sufficiently high pressure being contained in the air chamber C to support the weight of the aeroplane or hydro-aeroplane. A hole B' is formed in the displacement ram B near its upper end to permit the compressed air to occupy the interior of the said ram as well as the air chamber C. The lower end of the displacement ram B is perforated, or the rod D' passes through the same loosely, to permit the oil to flood the lower end of this ram to a sligth depth when the parts are in their extended position. It will be understood that at the moment of striking the ground or the water, the wheels and axle, the skids or the floats as the case may be, and hence also the oil cylinder A will be forced upward relatively to the air chamber C to an extent depending upon the severity of the impact. This movement of the oil cylinder causes the air space to decrease and a consequent compression of the air to take place, and the displacement ram B simultaneously drives the oil out of the oil cylinder A through the gradually diminishing annular space between the latter and the ram, into the air chamber C, this action dissipating the energy of the impact. The oil driven out of the oil cylinder A passes through the perforations in the guide cylinder A' to the air chamber C. The cylinder in its upward movement carries the piston D with it, so that the oil, which is in the lower end of the displacement ram B and which normally occupies a space above the piston D, flows around the edge of the piston to the underside thereof; this oil may be supplemented by oil which passes through the hole or other leakage space from the oil cylinder into the ram. When the energy of the impact has been dissipated the parts are returned to their normal or extended position by the compressed air, the oil collected in the air chamber C being returned to the oil cylinder by the air pressure; during this return movement the oil in the lower end of the displacement ram B beneath the piston D prevents the said piston from striking the end of this ram, and causes a dashpot action to take place.

In the modification shown by Figs. 3, to 7 the displacement ram B is provided with flat surfaces $b, b, b, b$ (see Figs. 5, 6 and 7), which are parallel to the axis of the ram and is also provided at the corners with surfaces $b^x, b^x, b^x, b^x$ which taper in the longitudinal direction. The upper end of the oil cylinder A is formed with a square hole which closely fits the outer part of the displacement ram B except at its tapered surfaces $b^x$; it will thus be seen that when the ram enters the oil cylinder A the liquid displaced thereby will pass to the air chamber C through gaps $a^x, a^x, a^x, a^x$, left between the said tapered surfaces and the corners of the square hole; it will also be seen that these gaps will become smaller in area the farther the oil cylinder A enters the air chamber C. The displacement ram B thus serves the same purpose as the ram shown by Figs. 1 and 2 and at the same time serves to support the oil cylinder A during its movement in the air chamber C thereby enabling the aforesaid perforated guide cylinder A' to be dispensed with. It will be obvious that the ram instead of being of square formation might be polygonal or triangular in cross-section. It will also be understood that other similar arrangements such as a cylindrical ram formed with tapering keyways or flat surfaces might be employed to achieve the same objects.

Instead of the said gaps or other passage or passages being formed between the displacement ram and the air chamber they may be formed between the displacement ram and a suitably shaped rod or extension projecting upwardly or inwardly from the base of the oil cylinder, the lower or inner end of the displacement ram being left open for the entry of the said rod or extension.

The lower end of the displacement ram B is formed with slots $b'$, $b'$, $b'$, $b'$, coinciding with the aforesaid tapered surfaces; these slots enable the oil to pass freely from the oil cylinder A to the air chamber C during the first portion of the upward movement of the oil cylinder.

In the interior of the displacement ram B is arranged a pipe $b^2$ whose lower end terminates near the bottom of the hollow ram and whose upper end is carried by a plate $b^3$ which is so situated as to form a chamber $b^4$ communicating by the hole B' with the air chamber. As aforesaid this arrangement insures that if any appreciable quantity of oil should collect at the bottom of the hollow ram during the telescopic action of the device this oil will, during the extension of the parts, be blown out through the pipe $b^2$ into the air chamber C.

The piston D is in the form of an enlargement of the upper end of the oil cylinder and works in the lower part of the air chamber C. This enlargement is formed with one or more holes $d'$ leading from the interior of the oil cylinder to the lower surface of the said enlargement. Thus when the oil cylinder A commences to move upward in the air chamber C the pressure of the air in this chamber causes some of the oil to pass through the hole or holes $d'$ to the underside of the enlargement D so that the aforesaid buffer action will take place on the return movement of the oil cylinder, the oil between the underside of the enlargement and the lower end of the air chamber C being forced through the hole or holes $d'$ into the oil cylinder during this return movement.

It will be observed that in each of the constructions shown the effective length of the guide surfaces between the oil cylinder and the part or parts that guide it becomes greater as the contracting movement increases, thereby insuring the stability of the landing device even when subjected to violent shocks.

One or more suitable plugs are provided for enabling the oil cylinder A and the air chamber C to be charged or replenished with oil and compressed air when desired.

It is important to note that the resilient landing devices above described are characterized by a complete absence of springs and valves and provide as aforesaid a comparatively long working stroke without being of large overall dimensions. It will be understood that one or more than one of the devices may be used on an aeroplane or hydroaeroplane as desired.

What I claim and desire to secure by Letters Patent of the United States is:—

1. In a resilient landing device for aeroplanes and hydro-aeroplanes, the combination of two telescopic members, one constituting a liquid chamber and the other comprising a chamber containing gas under pressure and also comprising a displacement ram which is arranged to move into the liquid chamber when the members are caused to contract and by means of which the opening between itself and the liquid chamber is gradually decreased upon said contraction whereby a portion of the liquid is forced from its chamber to the gas chamber.

2. In a resilient landing device for aeroplanes and hydro-aeroplanes, the combination with two telescopic members one constituting a liquid chamber and the other comprising a chamber containing a gas under pressure and also comprising a displacement ram by which, when the members are caused to contract, a portion of the liquid is forced from its chamber to the gas chamber to further compress the gas, of a buffer piston which works in a space supplied with liquid from the said liquid chamber.

3. In a resilient landing device for aeroplanes and hydro-aeroplanes, the combination with two telescopic members one comprising a gas chamber and a displacement ram and the other member constituting a liquid chamber, of an enlargement on said liquid chamber constituting a piston working in the lower or inner end of the air chamber, this enlargement being formed with one or more openings serving to place the lower or outer surface of the said enlargement in communication with the liquid in the liquid chamber.

4. In a resilient landing device for aeroplanes and hydro-aeroplanes, the combination with two telescopic members one constituting a liquid chamber and the other comprising a chamber containing a gas under pressure, and also comprising a displacement ram, of means whereby said ram will guide the liquid chamber during its reciprocating movements and at the same time will enable liquid to pass from the liquid chamber to the air chamber during the contraction of the telescopic members to further compress the gas in the gas chamber.

5. In a resilient landing device for aeroplanes and hydro-aeroplanes, the combination with two telescopic members one constituting a liquid chamber and the other comprising a gas chamber and a hollow displacement ram closed at its lower or inner end, of a pipe within said ram, the lower or inner end of this pipe terminating adjacent to the lower or inner end of the ram and the outer end of this pipe communicating with the air chamber.

In testimony whereof, I affix my signature.

THOMAS SMITH DUNCAN.